United States Patent

[11] 3,611,901

| [72] | Inventor | Paul Fahlenberg<br>Baierbrunn near Munich, Germany |
|---|---|---|
| [21] | Appl. No. | 532,793 |
| [22] | Filed | Mar. 8, 1966 |
| [45] | Patented | Oct. 12, 1971 |
| [73] | Assignee | Compur-Werk Gesellschaft mit beschrankter Haftung & Co.<br>Munich, Germany |
| [32] | Priority | Mar. 17, 1965, Mar. 17, 1965, Nov. 19, 1965 |
| [33] | | Germany |
| [31] | | C35,341, C12 835 and C37437 |

[54] CONTROL ARRANGEMENT FOR PHOTOGRAPHIC APPARATUS
11 Claims, 17 Drawing Figs.

[52] U.S. Cl. .......................................... 95/53
[51] Int. Cl. .......................................... G03b 9/58
[50] Field of Search .......................... 95/11.5, 53

[56] References Cited
UNITED STATES PATENTS
3,218,945  11/1965  O'Brien .......................... 95/4.5
3,307,459  3/1967  Proud .......................... 95/4.5
2,978,970  4/1961  Fahlenberg .................. 95/11.5

*Primary Examiner*—John M. Horan
*Attorney*—Stonebraker & Shepard

ABSTRACT: Electronic apparatus for controlling an adjustable part of a photographic camera. The control arrangement is set into operation by an electric impulse, produced by movement of a manually movable member to initiate the control operation. In one embodiment (FIGS. 1–14), the initiating electric impulse serves to activate a resistance bridge which comes into balance and stops further movement when a movable adjustable part on the camera reaches a position corresponding to that of a manually movable member on a control box, which may be located at a point remote from the adjustable part on the camera. In this embodiment, the adjustable part on the camera may serve to adjust a diaphragm aperture, or a shutter speed control member, or a focusing member. In a second embodiment (FIGS. 15–17), the initiating electric impulse serves to activate transistorized electronic circuitry which controls the extent of a first exposure delay period (prior to opening the shutter blades) and also the extent of a second exposure delay period while the blades are open, thus determining the duration or speed of the exposure.

Fig. 1
Fig. 2
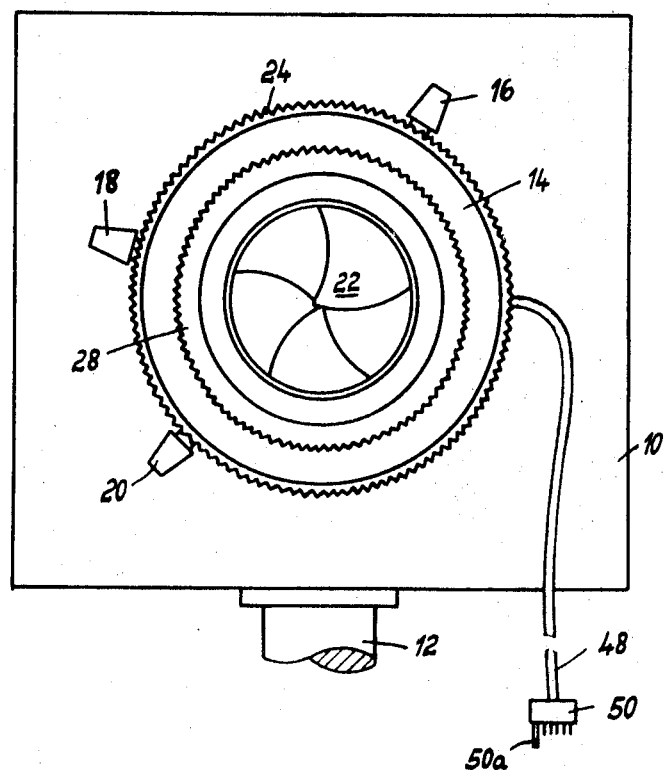
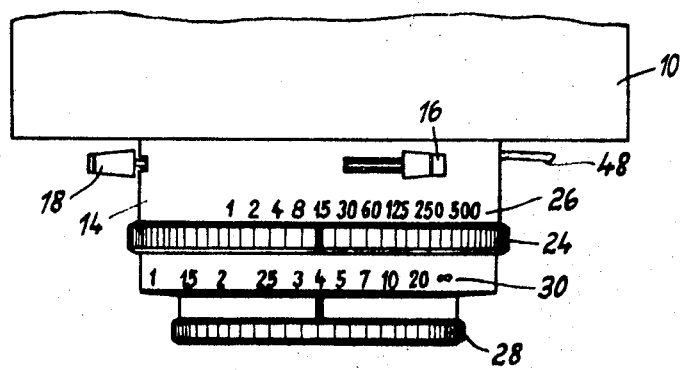

CONTROL ARRANGEMENT FOR PHOTOGRAPHIC APPARATUS

This invention relates to apparatus for controlling one of the variable factors which has to be set when taking a photograph, for example the setting of the diaphragm aperture.

An object of the invention is the provision of generally improved and more satisfactory control apparatus for this purpose.

Another object is the provision of control apparatus of simple and compact form, which can be operated from a remote point to set a variable factor such as a diaphragm aperture.

Still another object is the provision of such apparatus so designed as to be useful especially but not exclusively in connection with photographic cameras of the so-called "studi" type.

A further object is the provision of electrically operated control apparatus which operates faster and more efficiently than the control apparatus of the prior art.

A still further object is the provision of apparatus fulfilling some or all of the above-mentioned objects, and so designed that it automatically shuts itself off at the end of each separate adjusting step, so as to avoid electric current consumption from the battery without requiring special attention on the part of the operator to disconnect the battery.

Another object is the provision of a simple electric control unit designed to be operatively connected to a camera by a plug-in cable and having an operating range which may be greater than the range of adjustment of a particular camera with which it may be used, so that the operator of a studio, for example, may use a single control unit selectively with any one of a number of cameras having various different ranges of adjustability.

These and other desirable objects may be attained in the manner disclosed as an illustrative embodiment of the invention in the following description and in the accompanying drawings forming a part hereof, in which:

FIG. 1 is a front view of a typical form of photographic camera adapted for use with the electrical control means of the present invention;

FIG. 2 is a fragmentary top plan view thereof;

Figure 3:
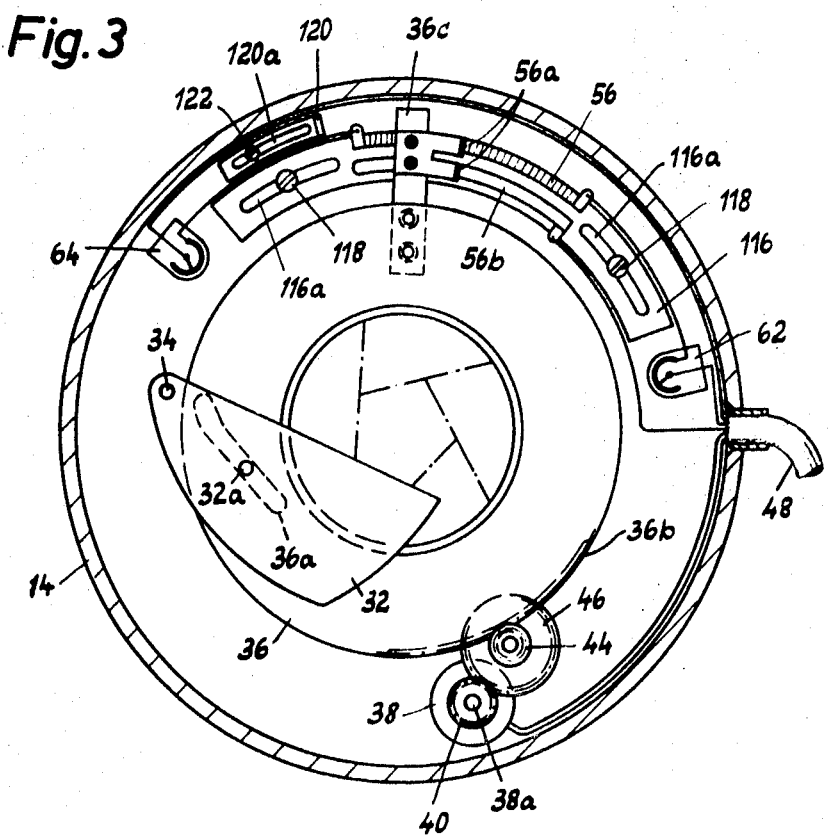
FIG. 3 is a somewhat schematic front view of the diaphragm arrangement of this camera, and associated parts.

FIGS. 1 and 2 illustrate a camera having a main body 10 mounted on a stand or support 12. On the front wall of the camera is an objective shutter indicated in general at 14, which is tensioned or cocked by means of a lever 16, and released for making an exposure by operating a trigger or trip member 18. The shutter also has another lever 20 for opening and closing the shutter blades independently of the exposure opening movement, to provide for interim inspection of the image which appears on a focusing screen mounted at the rear of the camera, not shown here but well known in the art. When the operator is satisfied with the image as shown on the focusing screen, he removes the screen and replaces it with a film holder loaded with photographic film. Cameras of this general type are well known are often called studio cameras, and are frequently used for taking portraits or photographing other objects in a studio.

The control arrangement of the present invention is not confined to use with a studio camera, but is especially useful with such a camera, because the invention provides a simple and convenient means whereby the photographer, while standing behind the camera to observe the image on the focusing screen, may control the size of the diaphragm aperture without leaving his position at the rear of the camera. Unless there is some provision for remote control of the diaphragm, such as provided by the present invention, it is necessary for the photographer to be at the rear of the camera to observe the image on the focusing screen, then if he wishes to change the diaphragm aperture to increase or decrease the depth of field he must move to the front of the camera to operate the usual conventional diaphragm adjusting means to change the diaphragm aperture and thereby change the depth of field, then he must again go to the rear of the camera to observe the image on the focusing screen and see whether it meets his approval, in view of the adjustment which was made. This time consuming and awkward procedure is avoided by the present invention, since the photographer may, by using the remote control mechanism of the present invention, quickly and easily adjust the diaphragm aperture while he is standing at the back of the camera, without having to move the the front.

Installed in the shutter 14 are the usual known arrangements (not here illustrated) for driving the shutter blades and for adjusting the shutter speed or time of exposure, the shutter speed being, for example, manually set selectively by means of the conventional setting ring 24 turned to bring the index mark thereof opposite any desired one of the shutter speed graduations on the scale 26. The shutter housing 14 also contains the usual objective lens, mounted for focusing movement in response to turning the focus adjusting ring 28 to bring the index mark thereon opposite a desired graduation of the focus distance scale 30. These adjustments of shutter speed and focus distance are conventional and need not be further illustrated or described.

Figure 4:
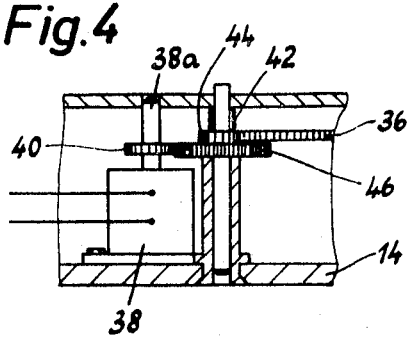
FIG. 4 is a section through the lower part of the construction shown in FIG. 3, illustrating additional details.

Also incorporated in the shutter is an iris diaphragm having the usual plurality of diaphragm leaves or blades 32, each mounted on a fixed pivot 34 and each carrying a control pin 32a which engages in a control slot 36a of a diaphragm control ring 636 rotatably mounted in the shutter housing for rotation concentrically around the optical axis, as usual. ONly one diaphragm leaf is illustrated in FIG. 3, certain edges of other leaves being schematically depicted by dot-dash lines. According to the preferred embodiment of the present invention, the diaphragm control ring 36 is not manually adjustable but is moved by means of an electrically operated setting motor 38, the shaft 38a of which (see FIG. 4 as well as FIG. 3) carries a toothed pinion 50 which meshes with and drives a gear 46 rotatable on a shaft parallel to the motor shaft 38a. Mounted on the same shaft, immediately above the gear 46, is a pinion 44, the teeth of which mesh with gear teeth 36b on the periphery of the diaphragm control ring 36. A coil spring 42 surrounding the shaft presses the lower face of the pinion 44 tight against the upper face of the gar 46, thereby forming a slip clutch between the two members 44 and 46, so that the pinion 44 tends to turn with the gear 46 when the latter is driven by the motor 38, but if there is obstruction which prevents the diaphragm control ring 36 from turning any further, the gear 46 may slip relative to the pinion 44, avoiding damage.

To provide for remote setting of the diaphragm the circuit wires for the operating circuit of the electric motor 38, together with other circuit conductors further mentioned below, pass out of the shutter housing 14 in the form of a cable 48 of appropriate length, provided with a plug 50 (FIG. 1) which can be inserted in a socket 52a (FIG. 6) on a switch-box or control box 52 (FIGS. 5-7) which can be physically located at any desired place, such as at the back of the camera so that the photographer may operate the switchbox while he is standing behind the camera and observing the image on the focusing screen. The main elements of an electronically operated servocontrol or follower control are installed in this switchbox or housing 52, and are operatively connected electronically to each other in the manner illustrated mainly in the wiring diagram, FIG. 8, and described below.

Figure 8:
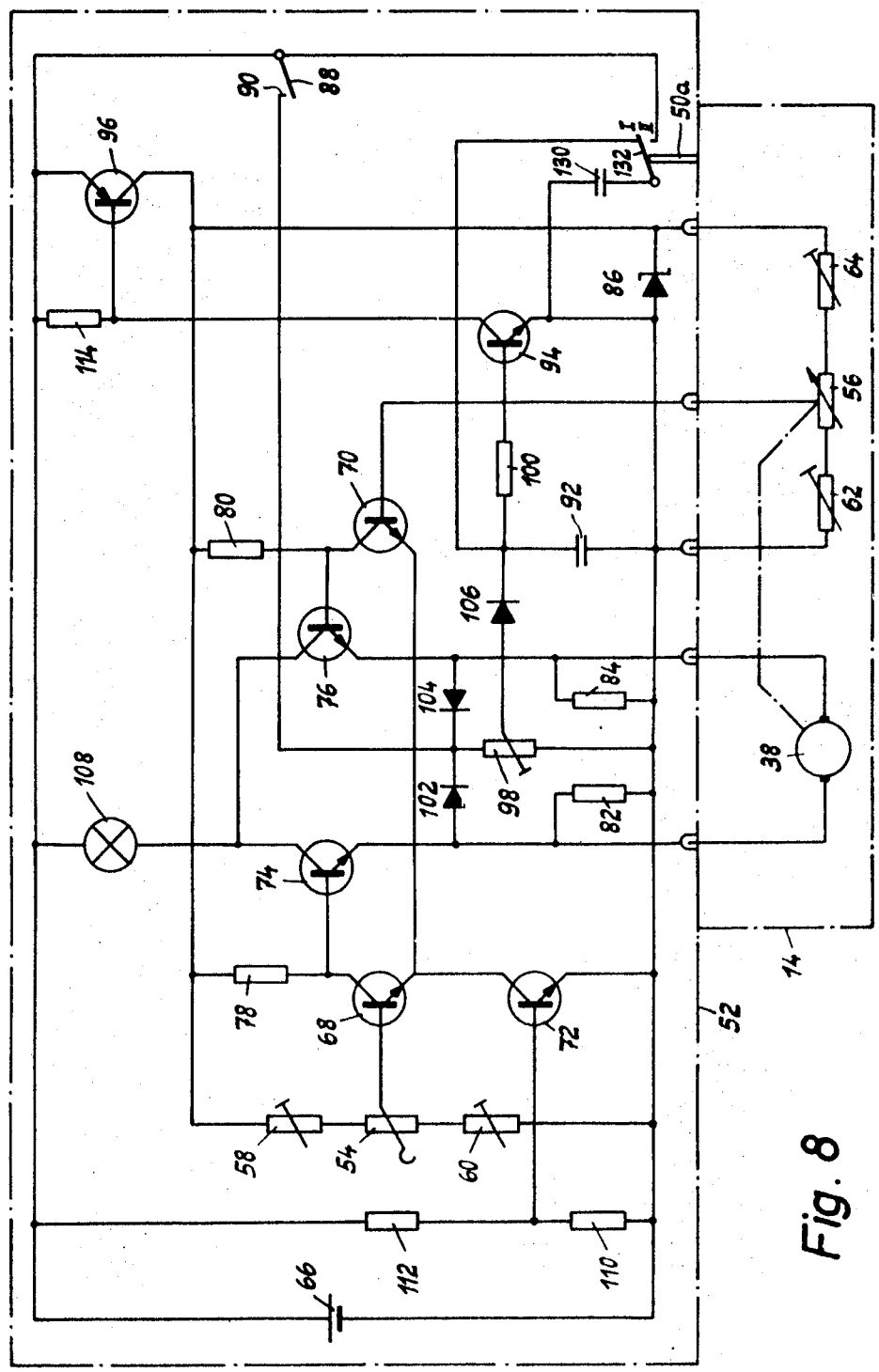
FIG. 8 is a schematic wiring diagram illustrating the electrical control parts of the invention.
Figure 10:
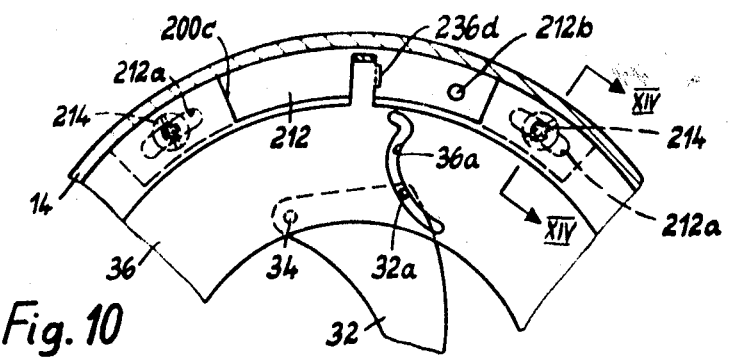
FIG. 10 is a view similar to a fragment of FIG. 9, illustrating further details.
Figure 14:
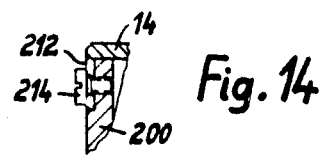
FIG. 14 is a fragmentary section taken approximately on the line XIV—XIV of FIG. 10, illustrating further details.

This control arrangement principally comprises a resistance bridge including the manually adjustable resistance 54 (FIG. 6) located in the control housing 52, and the balance resistance 56 (FIG. 3) located in the shutter housing 14, both of these resistances being in the form of adjusting potentiometers. Associated with each of these resistances 54 and 56 are two trim potentiometers as shown in FIG. 8, the trim potentiometers 58 and 60 being associated with the potentiometer 54, and the trim potentiometers 62 and 64 being associated with the potentiometer 56, as shown. By means of these trim potentiometers, the voltage drops at the adjusting potentiometers 54 and 56 can be tuned so as to produce a setting range which is suited to the particular operating conditions.

The source of electric current, for example a battery 66, is connected to one diagonal of a bridge network, while the other diagonal of the bridge network is connected to the setting motor 38 through a direct-current amplifier which includes two transistors 68 and 70, the emitters of which are connected to the collector of a further transistor 72. Two other transistors 74 and 76, acting as emitter followers, are associated with the transistors 68 and 70, respectively. In addition, the amplifier includes resistances 78 and 80, connected as shown to the transistors 68, 74 and 70, 76, respectively; and also other resistances 82 and 84 operatively connected as shown to the emitters of the transistors 74 and 76, respectively. The bridge voltage and the operating voltage for the transistors 74 and 76 are stabilized by a Zener diode 86 and thus are independent of variations in the battery voltage. A mechanical switch with a contact spring 88 (FIGS. 5, 7, and 8) is provided between the battery 66 and the resistance bridge, and is spring coupled to the setter of the manually movable resistance 54 in a manner described in more detail below. In the past position of the resistance 54, the spring 88 opens the current circuit, to disconnect the battery 66 from the bridge connection. The contact spring 88 is adapted to be pressed against a contact plate 90 which is connected to electronic switching means which will be brought into effect by the current impulse and will connect the battery to the bridge arrangement and will hold this connection until the end of the balancing of tee bridge, thus maintaining the connection throughout the control run of the parts.

This electronic switching arrangement comprises a condenser 92, and two transistors 94 and 96 coupled thereto, and a potentiometer 98, a resistance 100, and three diodes 102, 104 and 106. These diodes are tuned in combination with the potentiometer 98 in such a way that when the bridge is balanced, there is only a small voltage at the condenser 92 and the transistor 94 therefore cannot be operated.

A control lamp 108 is arranged in the common collector branch of the transistors 74 and 76 and is connected to the battery 66 in such a way that it will be illuminated during the adjusting run of the mechanism and will go out when the run is finished. Additional resistances in the network are indicated at 110, 112, and 114.

The potentiometer 56 in the shutter housing 14 has a sliding contact 56a (FIG. 3) carried by an insulating piece 36c on the diaphragm control ring 36. The potentiometer 56 and the associated contact strip 56b are provided on an insulating plate 116 which is circumferentially adjustable (concentrically with the optical axis) for setting purposes, and is fastened in set position by means of screws 118 which go through slots 116a in this insulating plate. For a purpose described below, the insulating piece 36c cooperates with an abutment piece 120 which can also be adjusted circumferentially and fastened in its adjusted position by a screw 122 extending through a slot 120a.

Figure 5:
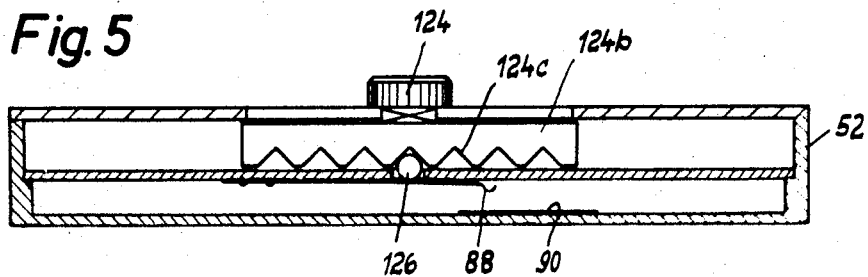
FIG. 5 is a schematic section through a switchbox constituting part of the control arrangement of the present invention.
Figure 7:
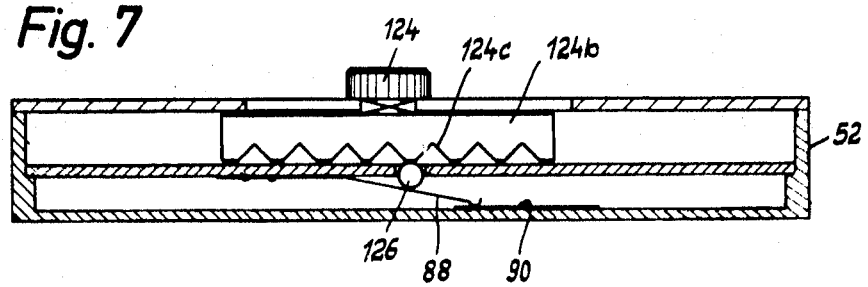
FIG. 7 is a view similar to FIG. 5, showing the adjusting parts in a different position.

The remaining elements of the electronically operated control arrangement are located in the switchbox 52 as already mentioned. The potentiometer 54 (FIG. 6) has a slider 54a carried by an insulating piece 124a which is coupled to the manually operable setter knob 124 mounted for manual displacement from the exterior of the box 52, in a direction parallel to the length of the resistance 54. The setter knob 124 is connected to a rack piece 124b, preferably of insulating material, having a plurality of notches 124c. A ball catch 126 movably mounted with slight play in a partition in the box 52, as shown in FIGS. 5 and 7, underlies the notched piece 124b and overlies the switch spring or contact spring 88, which spring is stationarily anchored at one end to the partition. The spring force of the member 88 tends to push the ball 126 upwardly against the piece 124b, seating it in one of the notches 124c if a notch happens to be opposite the ball, as in FIG. 5. Thereby it tends to hold the setting member 124 in this chosen adjusted position. If the setting member 124 is moved longitudinally to bring its index mark 124 opposite another one of the scale graduations of the diaphragm aperture scale 128 (FIG. 6), the ball 126 will be cammed downwardly out of the notch 124c in which it was seated, and the downward pressure on the ball will flex the contact spring 88 downwardly to bring its free end into electrical contact with the conducting plate 90, as shown in FIG. 7. Then when the member 124 moves a little farther so that the next notch comes opposite the ball 126, the ball will spring up again into the notch, to the normal rest position shown in FIG. 5. Thus the spring 88 makes only temporary or momentary contact with the contact plate 90, during movement of the setter 124 from one value to another value on the diaphragm aperture scale 128.

Figure 6:
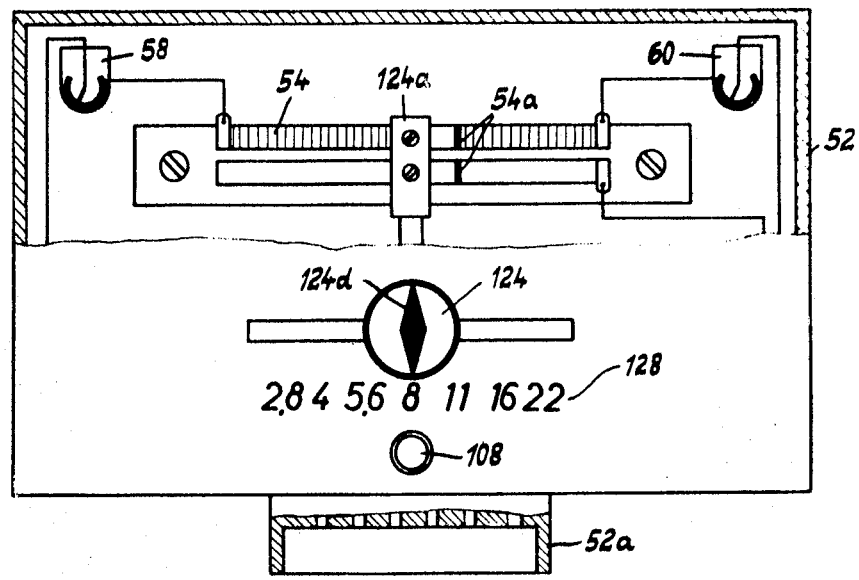
FIG. 6 is a plan of the switchbox, with parts removed to show other parts beneath, and with parts in section.

The electronically operated control arrangement constructed as above described, operates as follows: Let is be assumed that the switchbox 52 is connected to the rest of the mechanism by the cable 48 and the plug 50, and that the diaphragm is set at the value "8," meaning a value of f/8, in accordance with standard nomenclature. In the starting position of the arrangement, the battery 66 is cut out because the switch 88-90 is open, and thus the control lamp 108 is not illuminated. Incidentally, this lamp is preferably mounted on the box 52 in a position close to the diaphragm scale 128, as seen in FIG. 6.

To prepare to take a new photograph, the photographer has to tension or cock the shutter by means of the tensioning lever 16, and open the shutter blades 22 all the way for focusing purposes, by operating the lever 20. He can then make a preliminary inspection of the image as shown on the focusing screen at the rear of the camera. If he wishes to change the diaphragm aperture, he moves the setter knob 124 on the switchbox 52 in one direction or the other to vary the diaphragm aperture as he wishes.

If the setter knob 124 is adjusted from the initial starting position above mentioned, at the scale point for aperture "8," for example in leftward direction to the value 5.6, the contact spring 88 comes temporarily into contact with the conducting plate 90, being pressed downwardly by the ball 126. Thus, by momentarily closing the switch 88, 90, a current impulse flows from the battery 66 to the setting potentiometer 98 of the switching system, and this is sufficient to charge the compacitor 92 so that its stored potential reaches the critical potential of the transistor 94 and opens it. The opening of the transistor 94 now serves to open the transistor 96, causing the voltage stabilizing Zener diode 86 to be coupled to the battery 66 and to apply voltage to the servocontrol or follower arrangement.

The movement of the setter 124 and its slide 124a, 54a, also, serves to set up a nonsymmetrical condition in the bridge connections. The base of the transistor 68 then, for example, becomes positive, and a voltage drop occurs at the resistance 78, which reduces the base voltage of the transistor 74. As a consequence, there is also a small voltage drop at the resistance 82. Because of the emitter coupling of the transistors 68 and 70, a small voltage drop occurs at the same moment at resistance 80, and thus there is a corresponding voltage increase at the resistance 84 through the emitter follower 76. The potential difference which this produces between the resistances 82 and 84 causes the setting motor 38 between the resistances 82 and 84 causes the setting motor 38 to run in such direction that the potentiometer 56 coupled to and operated by this motor 38 moves in a balancing direction. Thereby the diaphragm control ring 36 is moved in a counterclockwise direction (under the assumed conditions above stated) and the diaphragm aperture is increased form the value "8" to "5.6." As soon as there is a balance between the bridge resistances 54 and 56, the setting motor 38 stops, and the servocontrol or follower procedure is terminated, unless and until there is a further movement of the manual setting knob 124 to another position.

During this procedure the control lamp 108 is illuminated, so long as the motion continues, and it is only extinguished when the bridge is balanced. As soon as this balance is achieved, the charge voltage in the capacitor 92 drops until the transistors 94 and 96 reach a blocking stage, as a consequence of which the control arrangement is disconnected from the battery 66 again, and the lamp 108 goes out, indicating to the photographer that the adjusting motion has been completed. The adjustment is performed very quickly, much quicker than in some of the remote control adjusting devices of the prior art.

The photographer may keep this electronic control for the diaphragm aperture in operation, by moving the setter 124 from one value to another, as often as required, until the image observed on the focusing screen has the required depth of field, which is dependent on the diaphragm aperture. When the photographer is satisfied with the appearance of the image, he recloses the shutter blades 22 by means of the lever 20, removes the focusing screen, replaces it with the film holder, and operates the trip or trigger 18 of the shutter to make the actual exposure at the preset exposure time and with the diaphragm aperture which he has set by the use of the present invention.

The control mechanism includes a second capacitor 130 and an associated switch 132. As will be seen from the wiring diagram, FIG. 8, when the switch 132 is in position I, the capacitor 130 is connected in parallel to the capacitor 92. When the switch 132 is shifted to its position II, the capacitor is operatively connected to the battery 66. The switch is spring biased toward its position II, and is moved from this position to the position I, against the spring force, by a pin 50a on the connection plug 50. When the plug 50 is plugged into the socket in the switchbox 52, the pin 50a automatically moves the switch 132 to its position I. When the plug is removed, the switch 132 automatically goes back to its position II.

Let it be assumed that the switch box 52 is separated from the plug 50 so that it is operatively disconnected from the shutter 14, and that the setter 124 is adjusted to the diaphragm aperture value "8" while the diaphragm leaves themselves in the shutter 14 at another aperture, such as "5.6." Since the switchbox 52 is separated from the shutter, the switch 132 is at position II, with the result that the capacitor 130 is charged with the battery voltage. Now if the plug 50 is plugged into the socket 52a, the pin 50a moves the switch 132 to its position I, so that the capacitor 130, previously charged by the battery 66, transmits an impulsive charge to the capacitor 92. This current pulse has the same effect as the pulse above described as being produced by the switch 88, 90, and it likewise sets the electronic switching arrangement into operation, as a result of which the servocontrol or follower arrangement is brought to battery potential, in the manner described, through the transistors 94 and 96. Since the bridge resistances 54 and 56 are not in balance at the moment that the plug 50 is plugged into the socket 52a, the setting motor 36 starts to move, in the manner described above, and the bridge resistance 56 is modified by operation of the motor until balance is achieved and the diaphragm in the camera is consequently set at the aperture value "8."

Thus when the switchbox 52 is operatively connected to the shutter 14, if the diaphragm on the camera is not at the aperture value indicated by the adjustable knob on the switch box, the servocontrol is automatically brought into operation by the means described, to bring the diaphragm on the camera to the value indicated by the position of the adjusting knob on the switchbox. Because of this, a single unitary switchbox can be used optionally with various different cameras, without causing any difficulties because the control on the switchbox might be set at a different value form the existing value of the diaphragm on the camera, at the time a connection is made. The user does not have to take any special pains in this regard, since the mechanism automatically brings the two values into agreement with each other, whenever the switch box is operatively connected to the camera.

To provide for a wide scope of use of the control arrangement, the control range thereof is chosen large enough to allow it to take care of all diaphragm values which are to be expected in various different cameras with which the control arrangement may be used. The bridge resistance 54 and the diaphragm scale 128 on the switchbox 52 thus have a very wide range, which may be wider than the available range of adjustment of a particular diaphragm on a particular camera with which the switchbox is to be used. For example, although the switchbox may provide for adjustment of the diaphragm to a maximum aperture of 2.8, it may be used with a camera whose diaphragm has a maximum aperture of only 5.6. Therefore, some of the values shown on the diaphragm scale 128 on the box 52, cannot actually be set when this box is connected to such a camera having a smaller range of diaphragm adjustment. In this event, the range of potential movement of the slide 36c, 56a (FIG. 3) over the balancing resistance 56, and consequently the range of setting available for the diaphragm leaves 32, must be limited by the limit stop 120 previously mentioned. In an attempt (by manipulation of the knob 124 on the box 52) to set the diaphragm to a value beyond its actual range, the slide 36c, 56a will abut against the limit stop 120, and the diaphragm control ring 36 will remain stationary in this limit position, but the slipping clutch between the gears 44 and 46 allows the setting motor 38 to continue to run and the control lamp 108 will remain illuminated. As a result, the operator sees that the lamp 108 remains lit instead of going out after a short interval, and thus the operator's attention is drawn to the fact that he has called for a value which the diaphragm cannot achieve. He then moves the control knob 124 back until the control lamp goes out, which is the position corresponding to the maximum aperture available on the diaphragm to which the control box is connected.

This action has been described with reference to maximum aperture, but the same operation takes place if the actual range of the diaphragm in the minimum aperture direction is less than the range shown on the scale 128. For example, although the scale 128 indicates that the apparatus may be used to set a diaphragm to a value of "22" yet if the diaphragm will not actually close down farther than "16" the movement of the knob 124 to the position "22" will result in continuous running of the motor 38 and continuous illumination of the signal lamp 108. When the operator notices that the lamp remains lit instead of going out, he can move the knob 124 back to the position "16" whereupon the lamp 108 will go out and the operator will know that the diaphragm is actually at the value "16."

Also it will be recalled that the plate 116 which carries the balancing resistance 56 can be adjusted circumferentially relative to the housing 14, in the manner above described. This enables variations in the position of the diaphragm aperture values with respect to the shutter 14, relative to the constant position of the diaphragm setting scale 128 on the box 52, to be adjusted to bring them into conformity, for different objectives.

Those skilled in this art will recognize at this point that the same servocontrol mechanism or followup mechanism can be used for adjusting any of the variable factors of a photographic exposure. The ring 36 operated by the motor 38 has been referred to specifically as a diaphragm adjusting ring, but those skilled in the photographic art will recognize that it could just as well be a shutter speed setting ring like the ring 24, or a focus adjusting ring like the ring 28. Thus the servocontrol or followup mechanism of the present invention is applicable to any of the adjusting rings of a camera. Of course an appropriate change would be made in the scale 128 on the switchbox, which scale would be graduated in suitable units appropriate to whichever variable factor is being controlled. By the present invention, all three of the factors of the diaphragm aperture, shutter speed, and focus distance could be separately controlled by the operator from the back of the camera.

In the embodiment of the invention thus far described, reference has been made to the possibility of adjusting the balancing resistance 56 in a direction circumferentially of the shutter housing 14, by loosening the screws 118 and moving the plate 116 circumferentially. In the physical structure previously described, however, this can be done only during initial assembly of the shutter, or upon opening up the shutter if subsequent adjustment is to be made. FIGS. 9–14 of the drawings show a further embodiment of the invention in which this adjustment, plus other adjustments, can be made from outside the shutter housing, without opening it up. This gives the advantage that adjustments to achieve the desired conformity can be carried out with a minimum of trouble, both for the manufacturer of the shutter, and later by the establishment installing the lens, if that is necessary.

Figures 12, 13:
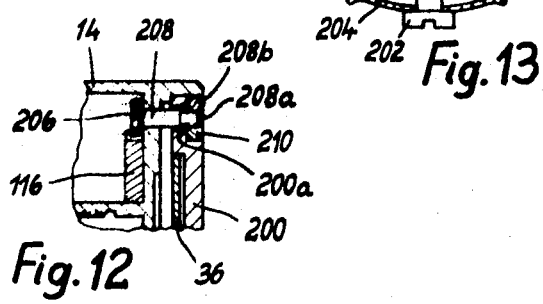
FIG. 12 is a fragmentary section taken approximately on the line XII–XII of FIG. 9.
FIG. 13 is a fragmentary section taken approximately on the line XIII—XIII of FIG. 9.
Figure 9:
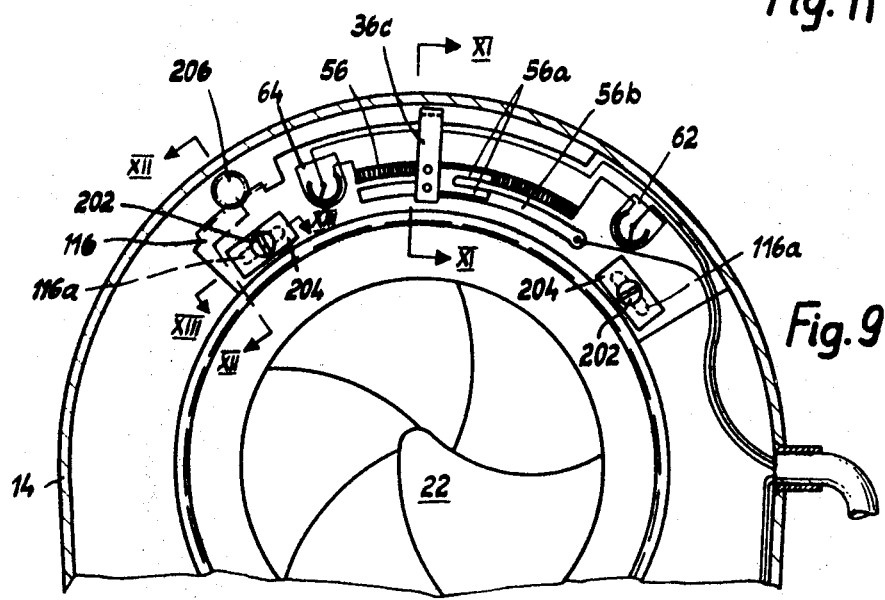
FIG. 9 is a view similar in general to FIG. 3, illustrating another embodiment of the invention.

To this end, the insulating plate 116 is mounted as shown in FIGS. 9 and 13, the screws 118 of the previous embodiment being replaced by screws 202 which do not engage tightly against the plate 116 but which engage friction springs 204 which bear against the plate. Thus, even when the screws 202 are tightened, the plate 116 is not held immovably but only frictionally, and is capable of moving in a circumferential direction in the shutter housing, to the extent permitted by the length of the slots 116a.

The circumferential adjustment of the plate 116 is accomplished by providing one edge of the plate with gear teeth as seen in FIGS. 9 and 12, engaged by a toothed pinion 206 firmly connected to a spindle 208 which extends rearwardly out through the backplate 200 of the shutter housing. At its rear end, the spindle 208 is provided with a diametrical slot 208a, and with external screw threads 208b. A locknut 210 provided with a screwdriver slot is screwed on the threads 208b, and when the nut is tightened on the threads, it bears against a locking shoulder 200a of the shutter closure plate 200. When the nut 210 is tightened, this prevents rotation of the spindle 208 and pinion 206, and thus holds the insulating plate 116 (and its potentiometer resistance 56 mounted thereon) in the stationary position which it then occupies.

If it is required to change the position of the potentiometer 56 in order, for example, to suit the diameter of the diaphragm to a specific lens as required by the focal length or aperture diameter of the lens, the nut 210 may be loosened a little. Then a screwdriver may be inserted in the slot 208a of the spindle 208, to turn the spindle and thereby, through the pinion 206, to move the insulating plate 116 circumferentially to bring the resistance 56 to the required position relative to the slider 56a. When the adjustment has been completed, the nut 210 is tightened against the shoulder 200a, thus locking the parts in the new position.

Figure 11:
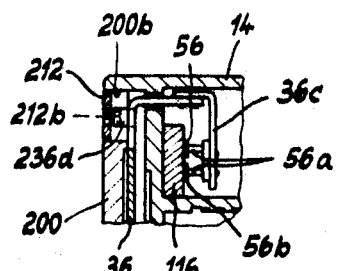
FIG. 11 is a section taken approximately on the line XI—XI of FIG. 9.

The insulating plate 116 carries the balancing resistance or potentiometer 56 and also the contact strip 56b acted upon by the slider 56a which is fastened to the insulating member 36c which is fastened to the control ring 36, as seen in FIG. 11. In this construction the trim potentiometers 62 and 64 associated with the resistance 56 are not mounted directly on the shutter housing 14, but are preferably mounted on the insulating plate 116, as seen in FIG. 9.

To enable the limiting abutment also to be adjusted from outside the shutter housing, the shutter in this embodiment is provided with an arcuate segment 212 (FIGS. 10, 11, and 14) located in a recess 200b in the closure plate 200, and carrying a limit pin 212b. This arcuate segment 212 may be moved circumferentially, and is held in adjusted position by means of screws 214 passing through arcuate slots 212a. It will be noted from FIG. 14 that the heads of the screws 214 are accessible externally of the shutter housing, so this adjustment can be made without opening the shutter. The segment 212 can be moved circumferentially to bring the abutment pin 212b to a position limiting the maximum open position of the diaphragm control ring to any selected value between 2.8 and 5.6, for example. The abutment pin 212b cooperates, for this purpose, with a lug 236d on the diaphragm control ring 36. The closure plate 200 has a fixed abutment 200c for the lug 236d to define the minimum diaphragm aperture "22" or whatever it may happen to be. However, the same adjustable abutment arrangement may be used, if desired, for defining the minimum diaphragm aperture, as well as for the maximum aperture.

Figure 16:
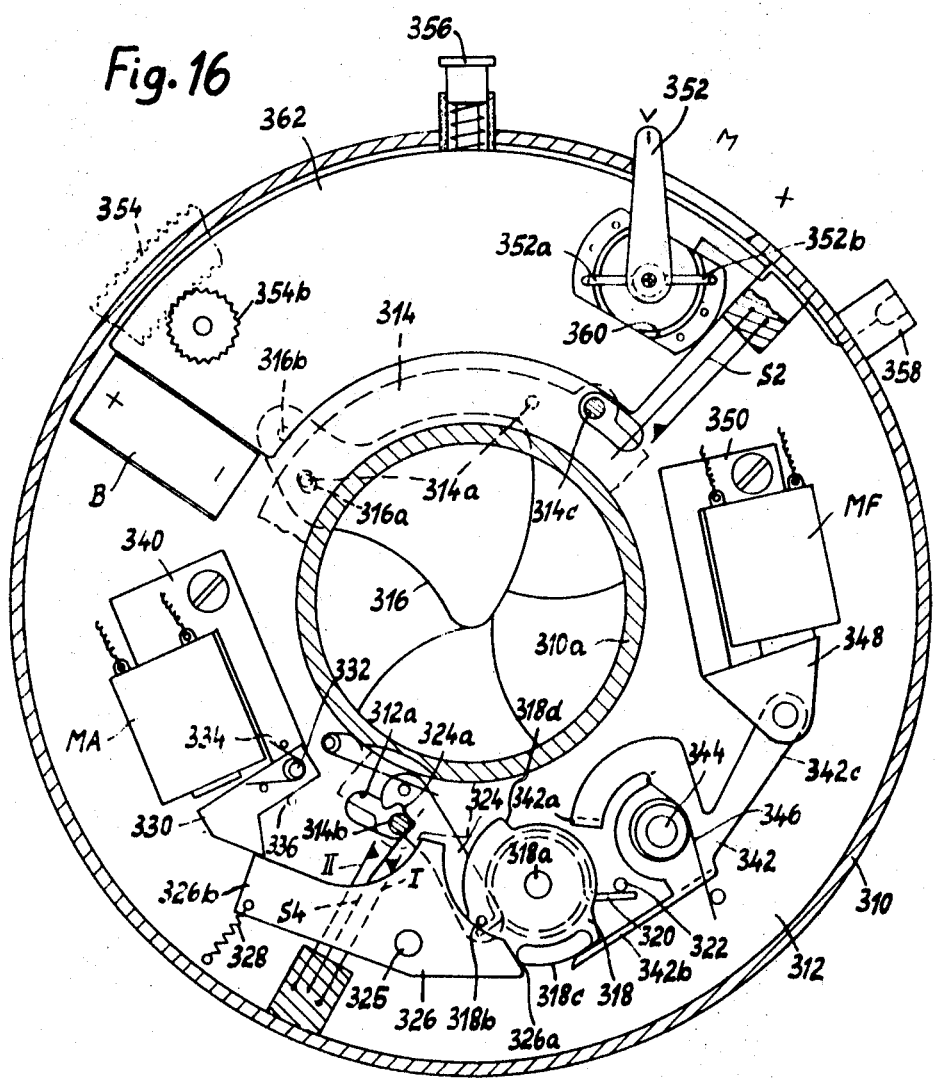
FIG. 16 shows in section shutter details of FIG 15.
Figure 15:
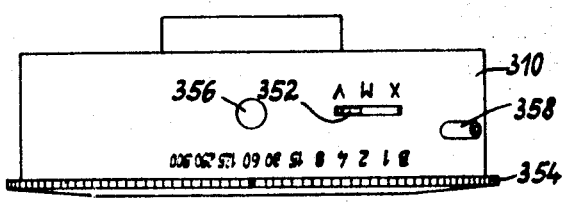
FIG. 15 shows another embodiment of the invention in use on a photographic shutter equipped with an electrical arrangement for establishing the shutter exposure period.
Figure 17:
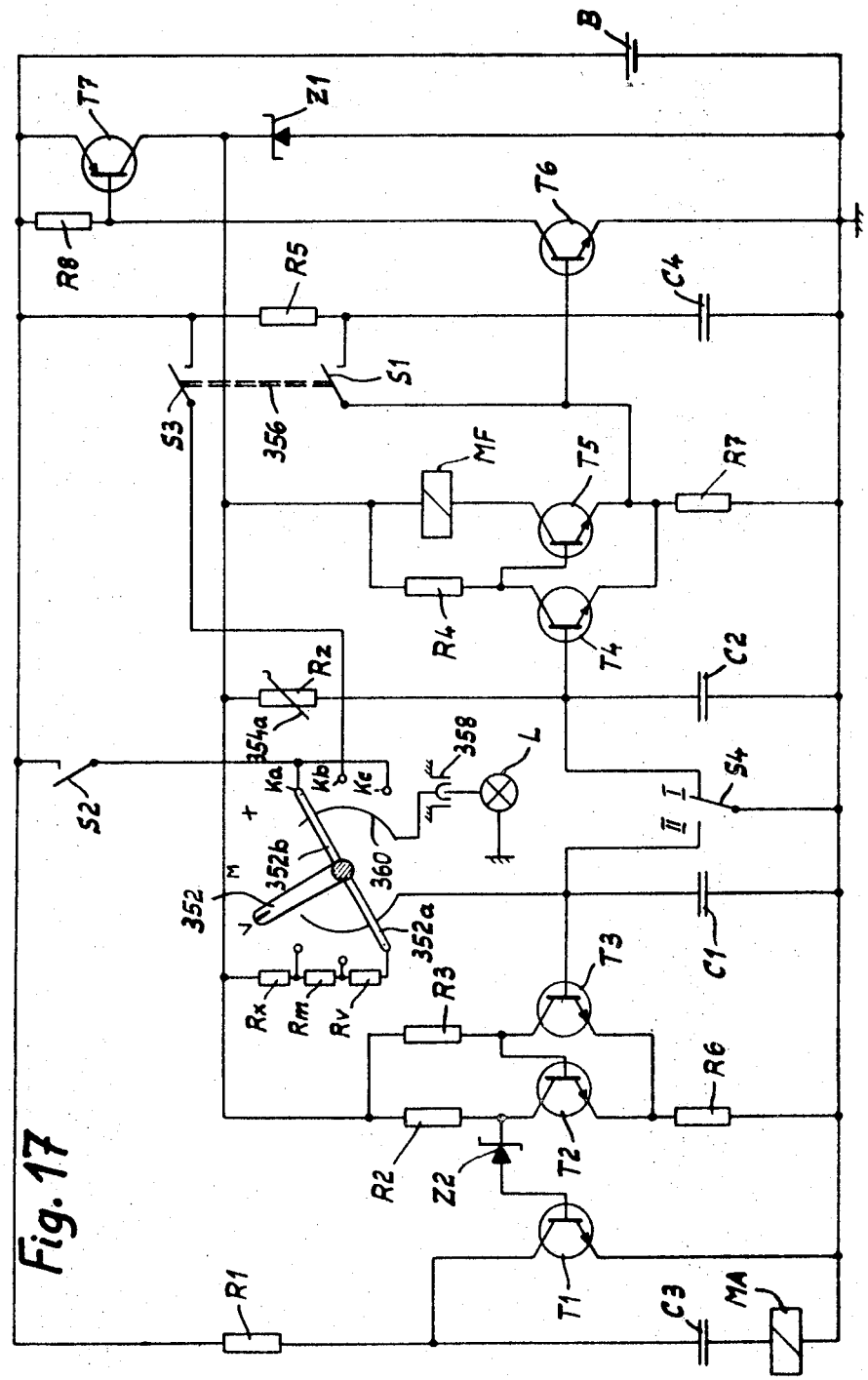
FIG. 17 is a wiring diagram of the arrangement shown in FIG. 15 and 16.

Another embodiment of the invention is illustrated in FIGS. 15 to 17. This embodiment is shown in use on a photographic shutter for establishing the shutter exposure period.

The shutter illustrated in FIGS. 15 and 16 comprises a housing 310 of the usual annular form having a baseplate 312, encircling the objective tube 310a secured in the interior thereof. Mounted for rotation around the objective tube 310a beneath the baseplate is a shutter blade driving ring 314 which carries pins 314a for actuating the shutter blades 316. These shutter blades are installed in a space provided beneath the driving ring 314, and are equipped with driving slots 316a accommodating the pins 314a. The fixed mounting pins for the shutter blades are designated 316b.

The driving ring 314 is operated by a main driving member 318 which is fastened to a cocking spindle 318a which is rotatably mounted in the shutter housing 310. Engaging round the cocking spindle 318a is a main spring 320 which is applied at one end against a fixed abutment 322, whilst its other end engages a hinge pin 318b of the main driving member 318. Also mounted on the pin 318b is a crank 324 which with a mouth 324a engages round a driving pin 314b firmly seated on the ring 314 and passing through an arcuate slot 312a in the baseplate 312.

The main driving member, crank and the driving ring represent known elements of a shutter blade driving means, for which reason it appears superfluous to describe the constructive features thereof in any more detail. The driving means are shown in FIG. 16 in the cocked condition; as soon as the main driving member 318, after release, moves towards its rest position (against the abutment 322,) the shutter blade driving ring will first be moved in the clockwise direction, to open the blades, and then subsequently in the counter-clockwise direction for closing these blades 316.

To cater for cocking the main driving member 318 and for loading its spring 320 the cocking shaft 318a passes rearwards out of the shutter housing 310 and is here, for example, coupled to the film feed means of the camera. The main driving member 318 is held in the cocked condition by a double-armed locking lever 326 which is mounted at 325 and has one arm 326a thereof in the path of travel of a raised portion 218c of the main driving member 318; in the position illustrated this portion prevents the run down movement of the member 318. Engaged with the other end 326b of the locking lever 326 is a restoring spring 328 and a metallic armature 330, the latter being pivotally mounted at 352. A return spring 334 biases the armature 330 in the counterclockwise direction against an abutment 336. The armature 330 is associated with an electromagnet MA which, along with its winding and core is secured by means of a carrier 340 to the baseplate 312.

Also associated with the main driving member 318 is a locking plate 342 which is rotatably mounted at 344 on the baseplate 313 and is subject to the action of a spring 346 which biases the plate 342 in the clockwise direction. The arm 342a of this plate projects into the path of travel of a peripheral formation 318d on the main driving member 318, and thereby limits movement of the main driving member 318 beyond a predetermined position. The arm 342b of the locking plate 342 bears temporarily against the periphery of the main driving member 318, whilst the arm 342c thereof carries a metallic armature 348 associated with a further electromagnet MF. This magnet and its winding and core are also fastened to the baseplate 312, in this case through the medium of a carrier 350.

The two electromagnets MA and MF are connected to an electronic arrangement for control of the exposure period, the connections of this arrangement being shown in FIG. 17. This arrangement, which is fed from a battery B, includes transistors T1 to T7, the transistors T2, T3 or T4, T5 in each case constituting an emitter-coupled Schmitt-Trigger. The trigger T2, T3 determines (in accordance with the data fed thereto from an associated, adjustable RC-member) the instant at which the release magnet MA is energized, that is to say the commencement of the opening movement of the shutter blades, with a predetermined time lag after the trip has been operated. In contrast, the trigger T4, T5 (likewise under the control of an associated, adjustable RC-member) determines the instant at which the magnet MF, used to effect the unlocking, is energized that is to say determines the commencement of the closing movement of the shutter.

The two transistors T6, T7, on the other hand, constitute a switch without any contact spring, and this, in accordance with the invention, couples the electronic arrangement to the current source after the trip has been operated and maintains the current flow during the operating phase of this arrangement.

Also provided in the switching arrangement described are condensers C1 to C4 and resistances R1 to R8. The condenser C1, together with further series-connected resistances $R_x$, $R_m$, $R_v$, constitutes the adjustable RC-member for the trigger T2, T3. A manually operable changeover member 352 of insulated material having a metallic wiper 352a connected thereto is used for selective switching in of these resistances. If all the series of resistances $R_x$, $R_m$, $R_v$ are connected up when the switch 352 is in the "V" position, the maximum time lag, for example 8 seconds, is set between the instant at which the releasing of the shutter takes place and the instant at which the shutter blades are open after the magnet MA has been energized.

In the position "M", on the other hand only the resistances $R_x$ and $R_m$ are effective and the time lag referred to is thereby shortened to 15 milliseconds. The minimum time lag, for example 2 milliseconds only, is afforded when the switch 352 is in the position "X."

The condenser C2, in combination with the selectively adjustable resistance $R_z$ which determines the period of exposure, constitutes the RC-member associated with the trigger T4, T5. The wiper 354a of the resistance $R_z$ is coupled, in the manner to be described in more detail later, with the manually adjustable exposure period setter 354 of the shutter.

The condenser C3, which is charged from the battery through the limiting resistance R1, serves as the energy supply for the magnet MA, as soon as the transistor T1, controlled through the trigger T2, T3 and the Zener diode Z2, permits discharge of this condenser.

The condenser C4 which is also charged form the battery B through the limiting resistance R5 delivers an energy pulse which, on closure of a switch S1, sets the additional electronic means, namely the switch-forming transistors T6, T7 and the associated voltage-stabilizing Zener diode Z1, into operation, which means then makes a connection between the battery and the remaining electronic arrangement for establishment of the exposure period, and keeps this arrangement supplied during the working phase. For this purpose the switch S1 is coupled to the shutter trip 356.

To enable flashlight photographs to be taken, a two-pole nipple 358 is provided at the periphery of the shutter, this having one pole connected to ground and the other to a conductor 360 which is traversed by a second wiper 352b of the switch 352. The wiper 352b is further connected to the contact points $K_a$, $K_b$, $K_c$ which are connected to the battery B in the manner illustrated. Disposed in the conductor to the contact point $K_a$ and $K_c$ is a closure contact S2 which is closed by a pin 314c of the shutter blade driving ring 324 only in the shutter-open position. On the other hand, a closure contact S3 is connected in the conductor to the contact $K_b$ and this, like the contact S1, is coupled to the shutter trip 356. A flash bulb L can be connected in known fashion to the nipple 358 through a suitable cable.

A switch S4 operated by the pin 314b of the shutter blade driving ring 314 assumes either the position I or a position II, as a result of which either the condenser C2 or the condenser C1 is short circuited.

The conductive connection between the individual elements of the electronic arrangement insofar as it has not been described in detail in the foregoing is apparent from the connections diagram of FIG. 17. The electronic elements and their conductive connections are advantageously disposed on the carrier 362 of insulating material which is secured within the shutter housing 310 to the base plate 312. The battery B is also detachably fastened to the carrier 362, for example by means of a plug coupling. The wiper 354a of the time-determining resistance $R_z$, also disposed on the carrier 362, is adjusted by the setting ring 354 through a toothed pinion 354b.

The arrangement described above operates in the following fashion:

FIGS. 15 and 16 show the shutter in the cocked position, with the switch 352 set to the mark "V" at the periphery of the shutter. This therefore implies that it is intended to take a picture with a very long delay period (8 seconds in the case of self portraits) after the releaser has been operated. In addition an exposure period of one-sixtieth second has been set by means of the ring 354. Both electromagnets MA and MF are dead so that the armature 330 is swung away as illustrated and, together with the locking lever 326, holds the main driving member 318 in the cocked position. The locking plate 342 is adjusted through the arm 342 cooperating with the periphery of the main driving member 318 in such a way that the arm 342c thereof applies the armature 348 against the deenergized magnet MF.

It is apparent from the diagram of FIG. 17 that the electronic arrangement is currentless in the rest or cocked condition of the shutter, because the transistors T6 and T7 are clocking in the switch position illustrated. The condensers C1 and C2 are also uncharged, whilst the condensers C3 and C4, which are connected to the battery B in the rest position, are charged through the associated limiting resistances R1 or R5 to battery voltage.

If now the user wishes to take a photograph he must operate the releaser 356. As a result the wiper contact S1 is closed and an impulse is given by the condenser C4 to produce a current flow through the amplifier transistor T6. As a result the switch transistor T7 is operated and a regulated operating voltage is applied from the battery B through the Zener-diode Z1 to the triggers T2, T3 and T4, T5. As a consequence the transistors T2 and T5 become conductive so that current also flows through the winding of the electromagnet MF. The connections are maintained from this point on so long as the transistor T5 is conductive, because this controls T6 and, as a result, T7 also.

As soon as the trigger T2, T3 is connected to the battery B, the condenser C1 begins to charge through the resistance set $R_x$, $R_m$, $R_v$. After a time lag, determined by these resistances, from the instant of release the condenser C1 reaches its threshold value, so that at the end of this delay period the trigger T2, T3 switches over, the transistor T2 becomes dead, and the transistor T3 becomes conductive. A positive impulse is therefore formed a the collector of T2, and this energizes the transistor T1 through the Zener-diode Z2 thus initiating the discharge of condenser C3 via the winding of magnet MA. The temporary energization of magnet MA then attracts its armature 330. The locking lever 326 is consequently released and the main driving member 318 can run down in the direction from the illustrated cocked position. The locking lever 326 is then pushed to one side by the raised portion 318c against the action of its return spring 328. The blades 316 are opened by the moving main driving member 318 through the crank 324 and the shutter blade ring 314 which is driven in the counterclockwise direction.

With the blades in their open condition, the formation 318d of the main driving member 318 strikes the locking nose 342a of the locking plate 342. Since the magnet MF is energized at this time, it firmly retains its armature in this position. Consequently the main driving member 318 is retained in the shutter blades-open position by the locking nose 342a. During the opening motion of the blade driving ring 314, the pin 314b changes over the switch S4 from I to II. This short circuits the condenser C1 and causes it to discharge, and the short circuit of condenser C2 is broken. This latter condenser then begins to charge through resistance Rz. When the delay period, controlled by the correspondingly regulated resistance Rz and determining the period of exposure, is past, and the condenser C2 has reached its threshold value, the trigger T4, T5 changes over so that transistor T5, which up to that time has been energized becomes dead and thus the current flow through the windings of magnet MF ceases. The armature 348 drops away from the magnet MF and spring 346 is then able to pivot the locking plate 342 in the clockwise direction far enough for its arm 342a to release the main driving member 318. This member 318, which has been temporarily locked in the open condition of the blades, can now continue to turn in the clockwise direction until it reaches the rest position defined by the abutment 322, as a result of which the shutter blade driving ring 314 moves back in the counter clockwise direction and the blades 316 are closed. The photograph has now been taken after the preset delay (8 seconds) and with the preset exposure period (one-sixtieth).

When the two electronically controlled delay periods have expired the transistor T5 and the electromagnet MF are deenergized as previously explained. As a consequence the switch-forming transistors T6 and T7 are again blocking so that the current flow from the battery to the electronic arrangement is discontinued. The condensers C1 and C2 are discharged, and only condensers C3 and C4 receive a small residual current from the battery B until they are charged, but these can be disregarded in the light of the present day quality of these constructional elements in relation to battery consumption.

It is further pointed out that, when the wiper 352b of the changeover switch 352 is in the chosen position "V", the contact point Ka is connected to the flash light nipple 358. It is thus possible, in this position "V", to use a flash light with a very short firing delay (X-lamp) and to fire this by closing the switch S2 (through the agency of the pin 314c on the shutter blade driving ring 314) in the open condition of the shutter blades.

The position "M" of the switch 352 is intended for use in taking flashlight photographs with M-lamps, which have a longer firing delay. The preliminary delay period (15 miliseconds) is thus here determined solely by the effective resistances Rx and Rm, and the impulse for firing the flash is transmitted to the flashlamp through the contact point Kb when the coupled contacts S1 and S3 are brought into the closed position by the trip 356.

The position "X" of the changeover switch device 352 is intended for use in taking photographs with practically no preliminary delay. In this case only the resistance Rx (2 miliseconds delay period) is effective. X-lamps can also be used with the X-setting, because the contact point Kc is applied to the flashlight nipple 358. Any required exposure period can be selected for all settings of the changeover switch 352, these being chosen through the agency of the exposure period setter S4 and the resistance R2 connected thereto.

It is clear from the foregoing that the switch in and out from the current source, is performed using only the additional-electronic means, that is to say without the use of spring contacts. The switches S1, S2 and S3 used in the arrangement described are only impulse emitting wiper contacts and any rebound phenomena to which they are subject after the impulse has been emitted have no effect. Admittedly rebounds could occur at the switch S4, when switching over from I to II takes place, but these would not have any disturbing effect because the delayed discharge of condenser C1 which results therefrom has no influence on the running down of the electronic arrangement and of the mechanical shutter. Again, any potential rebounding when the switch S4 is changed over from II to I are not troublesome because they can only occur towards the end of the operating phase of the electronic and mechanical equipment. It is evident that the present invention ensures an undisturbed operation both of the electronic and of the mechanical part of the shutter.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

1. A photographic shutter having blade means and having mechanical operating means movable from a first position in which said blade means are closed to a second position in which said blade means are open to make an exposure and movable to a third position in which said blade means are again closed to terminate the exposure, first blocking means for blocking movement of said operating means from said first position toward said second position, second blocking means for blocking movement of said operating means from said second position toward said third position, electrical control means operable through a cycle including in succession a first delay interval, release of said first blocking means, a second delay interval, and release of said second blocking means, said electrical control means including a source of current, means including a first capacitor and associated resistor means for determining said first delay interval, means including a second capacitor and associated resistor means for determining said second delay interval, said first and second capacitors being normally operatively disconnected from said source of current, electronic switch means responsive to a pulse for operatively connecting said first and second capacitors to said source of current to be charged thereby, a third capacitor connected to and charged by said source of current prior to initiating a cycle of operation, and means for initiating a cycle of operation, said initiating means including means for conveying a pulse from said third capacitor to said electronic switch means to cause said switch means to connect said first and second capacitors to said source of current and to keep them connected thereto throughout at least a substantial part of the remainder of said cycle.

2. A shutter as defined in claim 1, wherein said electronic switch means includes two transistors (T6 and T7) and a Zener diode (Z1).

3. A shutter as defined in claim 1, wherein said means for initiating a cycle of operation includes a manually movable shutter release member and a mechanical switch closed by releasing movement of said release member, said mechanical switch when closed serving to complete a circuit from said third capacitor to said electronic switch means.

4. A shutter as defined in claim 3, wherein said source of current is a battery.

5. A shutter as defined in claim 1, wherein said electrical control means includes transistors (T1, T2, and T3) interconnecting said first delay interval determining means and said first blocking means to release said first blocking means at the end of an interval determined by said first delay interval determining means, and also includes other transistors (T4 and T5) interconnecting said second delay interval determining means and said second blocking means to release said second blocking means at the end of an interval determined by said second delay interval determining means.

6. Photographic apparatus control means including a source of current in the form of a battery the voltage of which tends to decrease as a result of continued use, a circuit portion comprising interconnected transistor means, capacitor means, and resistor means for performing a control function, said circuit portion being normally operatively disconnected from said source of current, electronic switch means actuatable by an impulse and effective when actuated to connect said circuit portion operatively to said source of current, impulse storage means, including a capacitor normally connected to and maintained in charged condition by said battery and a switch movable from an open position to a closed position operatively connecting said impulse storage means to said electronic switch means to actuate the latter.

7. A photographic camera comprising an electronic circuit having a control portion including means for controlling an operating function of the camera, when said control portion of said circuit is operatively connected to a source of electric power, said means requiring operation through an interval of time to enable completion of said function, a battery providing a source of power for said control portion of said circuit, the voltage of said battery tending to decrease with continued use, said battery being normally operatively disconnected from said control portion of said circuit, electronic switch means including a transistor effective when in a conductive state to connect said battery operatively to said control portion of said circuit, impulse storage means, a switch movable from an open position to a closed position and effective upon closing to impress an impulse from said storage means on said electronic switch means to render said transistor conductive, thereby to provide power temporarily to said control portion of said circuit so that said control portion may control said operating function of the camera, and means included in said electronic circuit for automatically rendering said transistor nonconductive upon the completion of a functional operation of said control portion of said circuit, thereby to disconnect said battery from said control portion of said circuit until said switch is closed to initiate a new functional operation of said control portion of said circuit, to save drain on said battery during intervals when said control portion of said circuit is not actually functioning.

8. A camera as defined in claim 7, wherein said operating function performed by said control portion of said circuit includes the function of changing the aperture of a diaphragm.

9. A camera as defined in claim 7, wherein said operating function performed by said control portion of said circuit includes the function of timing the duration of exposure of a photographic shutter.

10. A camera as defined in claim 7, wherein said operating function performed by said control portion of said circuit includes the function of controlling the operation of a photographic flash in synchronized timed relation to the opening of a photographic shutter.

11. A camera as defined in claim 7, wherein said switch movable from an open position to a closed position is a mechanical switch closable manually to initiate each desired operation of said control portion of said circuit.